F. F. LANDIS.
MOLD.
APPLICATION FILED MAY 3, 1905.
985,353.
Patented Feb. 28, 1911.
2 SHEETS—SHEET 1.
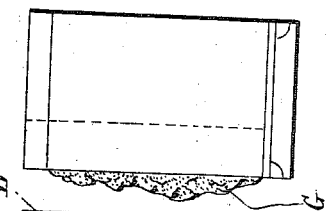
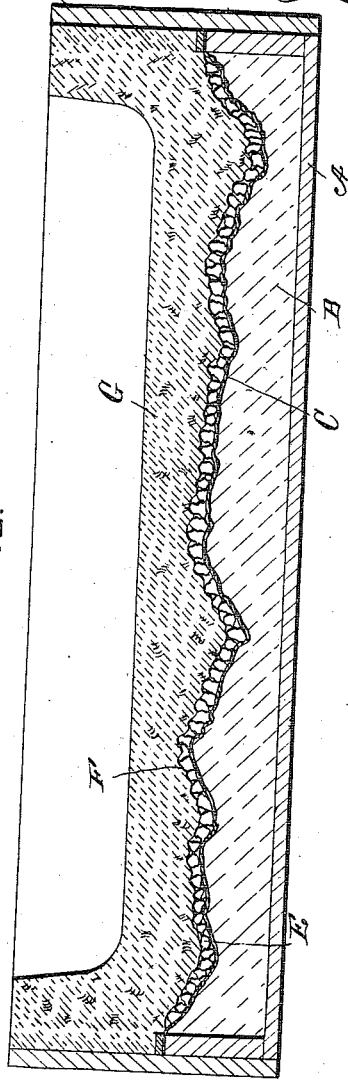
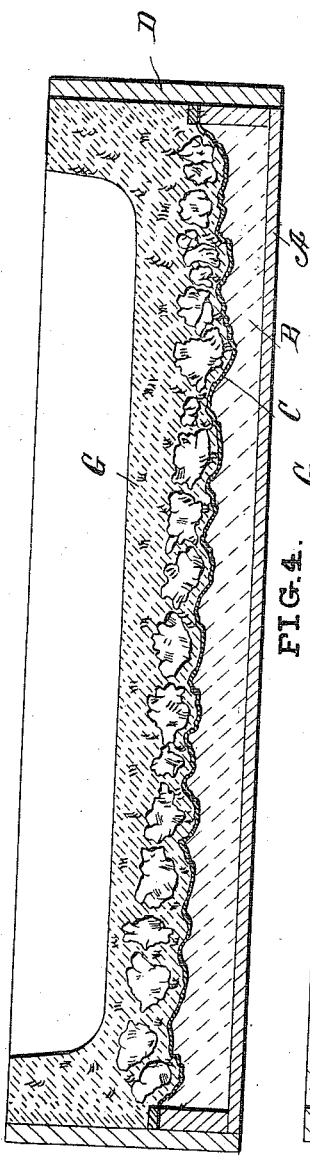
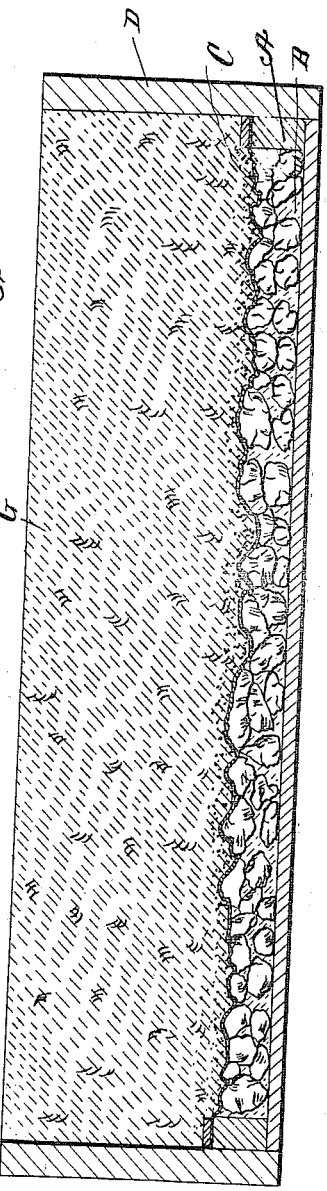
WITNESSES:
Chas. K. Davies.
M. W. Darg
INVENTOR
Frank F. Landis,
BY E. W. Bradford
Attorney

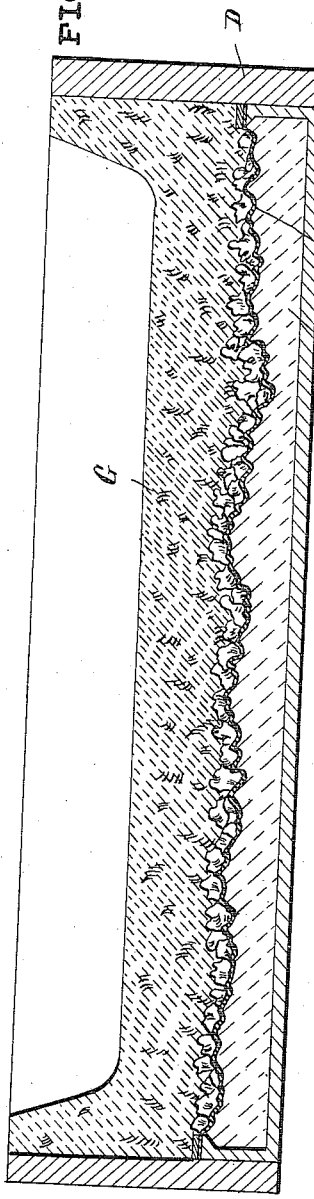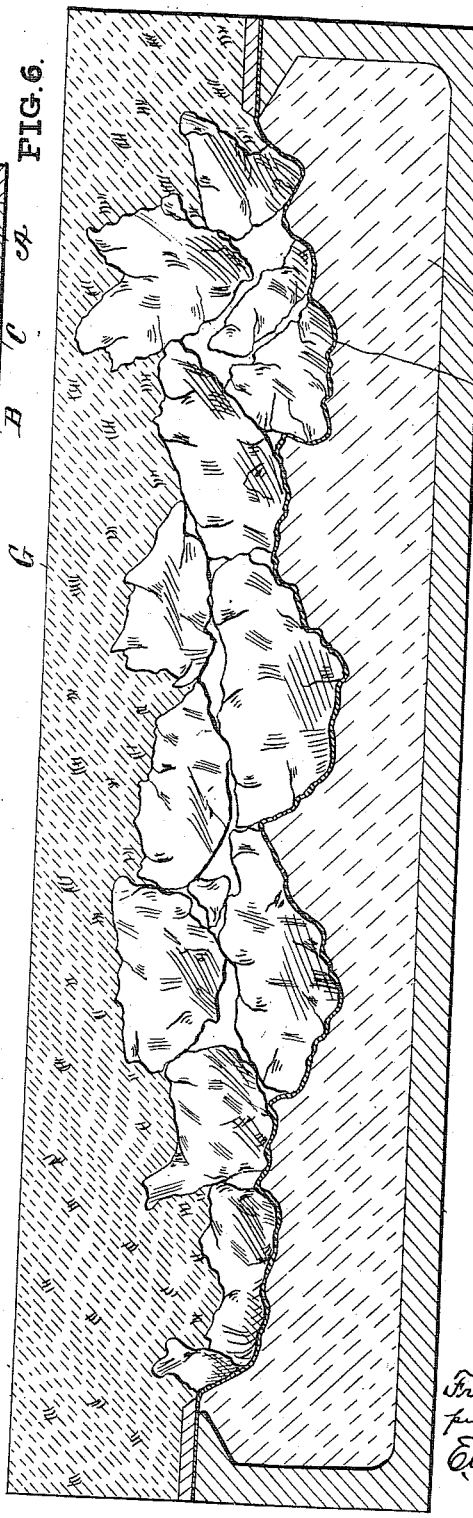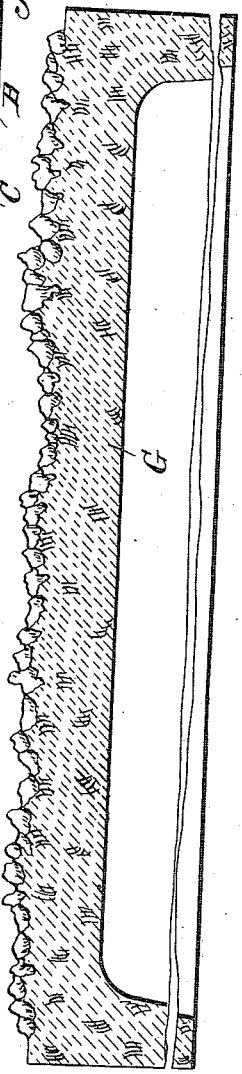

UNITED STATES PATENT OFFICE.

FRANK F. LANDIS, OF WAYNESBORO, PENNSYLVANIA.

MOLD.

985,353.  Specification of Letters Patent.  Patented Feb. 28, 1911.

Application filed May 3, 1905. Serial No. 258,686.

*To all whom it may concern:*

Be it known that I, FRANK F. LANDIS, a citizen of the United States, residing at Waynesboro, in the county of Franklin and State of Pennsylvania, have invented certain new and useful Improvements in Molds, of which the following is a specification.

A great objection to the use of the ordinary artificial stone or cement building blocks is the readiness with which they can be distinguished from the natural stone because of the regularity and sameness of their face outlines, resulting from each block being produced in a mold of similar character.

The object of my said invention is to provide an appliance for the production of artificial stone building blocks by the use of which the face of each block may be varied in design, character or configuration, so as to nearly resemble the outlines of natural broken or rough-hewn stone, and thus add greatly to the desirability of using such material for building purposes, all as will be hereinafter more fully described and claimed.

In the accompanying drawings I have illustrated my invention as used in a variety of ways for the production of building blocks with faces of different characters. In each instance, however, the leading feature of the invention, which consists in a changeable matrix covered by a flexible sheet, is employed.

In Figure 1 one method of using the invention is illustrated. It consists in filling the box A with plastic material B, which is of a proper composition in which the sharpest outlines may be made and retained. I find a composition of very fine perfectly dry clay with a small per cent. of pure flake graphite and just sufficient oil to bind the clay and graphite makes a stiff plastic which is not elastic, and one that will readily part from that which is molded or pressed upon it. Or a suitable grade of paraffin wax say at from 60 to 90 degrees treated so it will remain plastic, and coated with flake graphite or a very fine powdered mica, also readily parts from the material pressed upon it. A rubber composition specially prepared whereby it acquires more plasticity and parts with its elasticity also makes a suitable composition. There may be a number of other suitable plastics, possibly better and cheaper than the above and capable of accomplishing the same results. But to more fully meet the variety of conditions that such mold may be subjected to, and also the different modes of producing the different configurations, such as shown in Fig. 4, and in Figs. 5 and 6 wherein the configurations are produced by broken rock of considerable size, I prefer to use in combination with the said plastic a flexible sheet C, which rests upon and covers its surface. In use it is spread over the top of such material and secured along the top edge of box A in any approved manner. While rubber is the preferred material for said flexible sheet it will be understood of course that thin soft leather, or chamois skin, felt, knit, or woven materials or any substance that will cause the molded material to readily part from said plastic, may also be used for the purpose. The material B and the flexible sheet C being in position, the surface is distorted by pressing upon it at different points, thereby depressing said material B at one point and forcing it up at another until the form of the surface is of such character in configuration as may please the eye of the operator and suggests to him the best design for the face of the block desired. In order to re-produce a close imitation of the grain of the coarse stone such as is commonly used, the upper surface of said flexible sheet may be covered with fine pebbles or broken stone E which are preferably glued or cemented to the under side of another flexible sheet F, upon the top of which is deposited the concrete or material from which the block G is to be made, which material is pressed or tamped down within the mold upon the top of said surface and partakes of the outlines of the main matrix, the whole surface being roughened and given a character in imitation of coarse rough natural stone. By mixing with such material a small per cent. of broken glass of mica, the faces of the block will be given a luster even exceeding the luster of natural stone. The flexible sheet F prevents the small pebbles or broken stone from adhering to the face of the block and assists in its ready removal from the matrix as will be readily understood.

The faces of each block formed may be varied in character by merely depressing one part of the matrix and permitting another to bulge up at the same time. As a matter of fact, it will be practically impossible to produce two blocks of identically the same design of face unless the same mold is used for the purpose without any change whatever.

In Fig. 2 is shown an edge view which indicates the face or outlines of a building block of the character produced by the use of my invention.

In Fig. 3 is illustrated another method in which the flexible sheet F and broken stone E are not used. A thin layer of rich concrete of the color desired is first spread upon the flexible sheet C and then a layer of coarse wet stone is pressed in this layer of concrete and the mold filled with a coarser grade of concrete which is pressed upon the stone and matrix causing the thin layer of rich concrete under the stone to conform to their lower surface and produce the outline of said natural stone.

In the process as illustrated in Fig. 4 the matrix body A, the outside length and width being a trifle less than the inside length and width of main mold D to enable it to fit within said mold, is partly filled with natural rock and some plastic material. This construction of flexible matrix should be covered by said flexible sheet C. Instead of stone, rough and irregular pieces of wood, or other light substance may be used, and the weight of the matrix thus materially reduced. In such case the pieces may be of any form or shape to impart to the molded material the desired design. To form the face of a block upon such construction of matrix I place a thin layer of rich concrete composed of cement and sharp sand which will match the grade of stone to be imitated upon the flexible sheet C, then fill the mold D with coarser concrete and by pressing or tamping cause the flexible sheet and the plastic to conform to the upper surface of said rocks or substitute material, imparting to the face of the concrete block a true outline of the rock under flexible sheet C. After the molding of each block a few of the said rocks can be easily shifted under sheet C, making the configuration of each block individual.

In Figs. 5 and 6 I illustrate a process wherein the surface of the block is formed of broken natural stone. In this process the flexible sheet C on the plastic material B is covered with a layer of broken stone of the character desired, in a wet condition, and the mold is then filled with the concrete and pressed or tamped into place, when the concrete will become compressed into the recesses around the different stones and said stone will adhere thereto so that when the block is separated from the matrix the layer of stone will be embedded in the face of said block to form a natural stone face thereto. As illustrated on an enlarged scale in Figs. 6 and 7, it will be noticed that some of the stone will be below the layer which receives the cement and thus will not be connected with the block but will separate from the mold, leaving the surface of the character illustrated in Fig. 7 and providing a block of very desirable character. In the place of the stone, broken glass, shells, or any material desired to produce an effect may be used.

I have thus illustrated and described only a few of the many methods in which this invention may be employed for the purpose desired. It being adapted for use with tamp or press machines and in a variety of ways in the production of artificial stone, composition, cement or clay building blocks and will produce a block which will have the effect in the wall constructed thereof, of closely imitating the natural stone.

Having thus fully described my said invention, what I claim as new and desire to secure by Letters Patent, is:

1. The combination with a mold for forming concrete and like products, of a separate matrix for forming the outside face of said matrix for forming the outside face of said products comprising a layer of plastic shiftable material, and a flexible sheet covering the same, substantially as set forth.

2. The combination with a mold for forming concrete and like products, of a matrix comprising a box-like structure containing shiftable material, and a flexible sheet or diaphragm covering said material in said box, whereby said material may be shifted to change the configuration of the surface, substantially as set forth.

3. The combination, of a mold for forming concrete and like products, a matrix frame therein containing shiftable material, a flexible sheet spread over the surface of said material and arranged for changing the configuration of the matrix thus formed from time to time by shifting the position of portions of said shiftable material, substantially as set forth.

4. A mold for forming concrete and like products comprising a main body-shaping portion, a face-shaping matrix therein comprising a layer of shiftable material covered by a flexible sheet with the configurations desired for the face of the product formed therein, said shiftable material being adapted to be shifted in part from place to place in said matrix to change the configurations thereof, substantially as set forth.

5. The combination with a mold for forming concrete and like products of a face-forming matrix composed of a shiftable material having a surface of a character not adhesive to damp sand and clay, substantially as set forth.

In witness whereof, I have hereunto set my hand and seal at Waynesboro, Pennsylvania this 18th day of April, A. D. nineteen hundred and five.

FRANK F. LANDIS. [L. S.]

Witnesses:
CLARENCE E. MENTZER,
ALF. N. RUSSELL.